(12) United States Patent
Sheng et al.

(10) Patent No.: US 7,920,307 B2
(45) Date of Patent: Apr. 5, 2011

(54) SCANNING DEVICE HAVING A DOCUMENT PRESSING UNIT

(75) Inventors: Thomas Sheng, Hsinchu (TW); Hung-Wei Hsuen, Taichung (TW)

(73) Assignee: Avision Inc. (TW)

( * ) Notice: Subject to any disclaimer, the term of this patent is extended or adjusted under 35 U.S.C. 154(b) by 407 days.

(21) Appl. No.: 12/100,815

(22) Filed: Apr. 10, 2008

(65) Prior Publication Data

US 2008/0285093 A1    Nov. 20, 2008

(30) Foreign Application Priority Data

May 18, 2007  (TW) ................................ 96117694 A

(51) Int. Cl.
*H04N 1/04* (2006.01)
(52) U.S. Cl. ......... 358/498; 358/496; 399/367; 399/379
(58) Field of Classification Search .................. 358/498, 358/496; 399/367, 379; 271/278, 3.14
See application file for complete search history.

(56) References Cited

U.S. PATENT DOCUMENTS

| | | | | |
|---|---|---|---|---|
| 5,764,382 A * | 6/1998 | Shiraishi | ........................ | 358/496 |
| 6,147,778 A * | 11/2000 | Yamada et al. | ................ | 358/474 |
| 7,755,813 B2 * | 7/2010 | Nishikawa et al. | ............ | 358/497 |
| 2001/0033761 A1 * | 10/2001 | Takida et al. | .................. | 399/367 |
| 2009/0262401 A1 * | 10/2009 | Sheng | ............................ | 358/474 |

* cited by examiner

*Primary Examiner* — Cheukfan Lee

(57) ABSTRACT

A scanning device includes a transparent platen, a scanning module, a sheet-feeding mechanism, a section and a pressing unit. The scanning module is disposed at a scan position and acquires an image of a document through the transparent platen. The sheet-feeding mechanism transports the document in a transporting direction across the scan position. The section is located downstream of the scan position, and has a low point at a level lower than that of an upper surface of the transparent platen. The pressing unit is disposed opposite the section and limits a distance between the document and the transparent platen. A contact portion between the pressing unit and the document is lower than the upper surface of the transparent platen.

15 Claims, 5 Drawing Sheets

SCANNING DEVICE HAVING A DOCUMENT PRESSING UNIT

This application claims priority of No. 096117694 filed in Taiwan R.O.C. on May 18, 2007 under 35 USC 119, the entire content of which is hereby incorporated by reference.

BACKGROUND OF THE INVENTION

1. Field of Invention

The invention relates to a scanning device, and more particularly to a scanning device having a document pressing unit, wherein the pressing unit is configured to be disposed at a level lower than that of a scan platen of the scanning device in order to press a document.

2. Related Art

In a conventional automatic document feeder, rollers are usually utilized to transport a document across a scanning window so that a scanning module disposed below the scanning window scans the document to acquire an image of the document. The scan quality of the image of the document is associated with the depth of field of the scanning module. The greater depth of field allows the image sensor of the scanning module to acquire a sharp image of the document when the document is floating from the scanning window, whereas the smaller depth of field requires the document to be transported stably and in close contact with the scanning window.

When the document is transported across the scanning window, a conventional scanner is provided with a roller, which contacts with the scanning window, in order to effectively control the document to be positioned within the range of the depth of field of the scanning module. When the document is not transported across the scanning window, the roller is in sliding contact with the scanning window. When the document is transported across the scanning window, the roller is in rolling contact with the document, and the document is in sliding contact with the scanning window. In this case, the wear of the roller and the wear of the scanning window are very large, and may influence the scan quality. In addition, when the document contains thick sheets of paper, the document may not easily enter a nip between the roller and the scanning window so that the transporting procedure cannot be completed. Therefore, the document being transported is usually controlled to be positioned within the depth of field of the scanning module by elastically pushing the document against the scanning window in the prior art using either a flat plate or the roller. The contact surface area between the flat plate and the document is too large, and the document being transported across the scan region cannot be ensured to completely slide on the scanning window. More specifically, when a contact image sensor (CIS) module is utilized, the scan quality tends to be influenced more easily, and the conventional flat plate or roller cannot satisfy the requirement for obtaining quality images.

Alternatively, some scanning windows are hollow windows without glass. In this case, the roller rubs against the scanning module. Therefore, the prior art method accelerates the wear between the roller and the scanning window or between the roller and the scanning module, and thus influences the scan quality.

SUMMARY OF THE INVENTION

It is therefore an object of the invention to provide a scanning device having a document pressing unit, wherein the pressing unit is disposed downstream of a scan position to press a document to reduce friction between the pressing unit and a scan platen and effectively control a distance between the document and the scan platen.

To achieve the above-identified object, the invention provides a scanning device including a transparent platen, a scanning module, a sheet-feeding mechanism, a section and a pressing unit. The scanning module disposed at a scan position acquires an image of a document through the transparent platen. The sheet-feeding mechanism transports the document in a transporting direction across the scan position. The section is located downstream of the scan position and has a low point at a level lower than that of an upper surface of the transparent platen. The pressing unit, disposed opposite the section, limits a distance between the document and the transparent platen. A contact portion between the pressing unit and the document is lower than the upper surface of the transparent platen.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
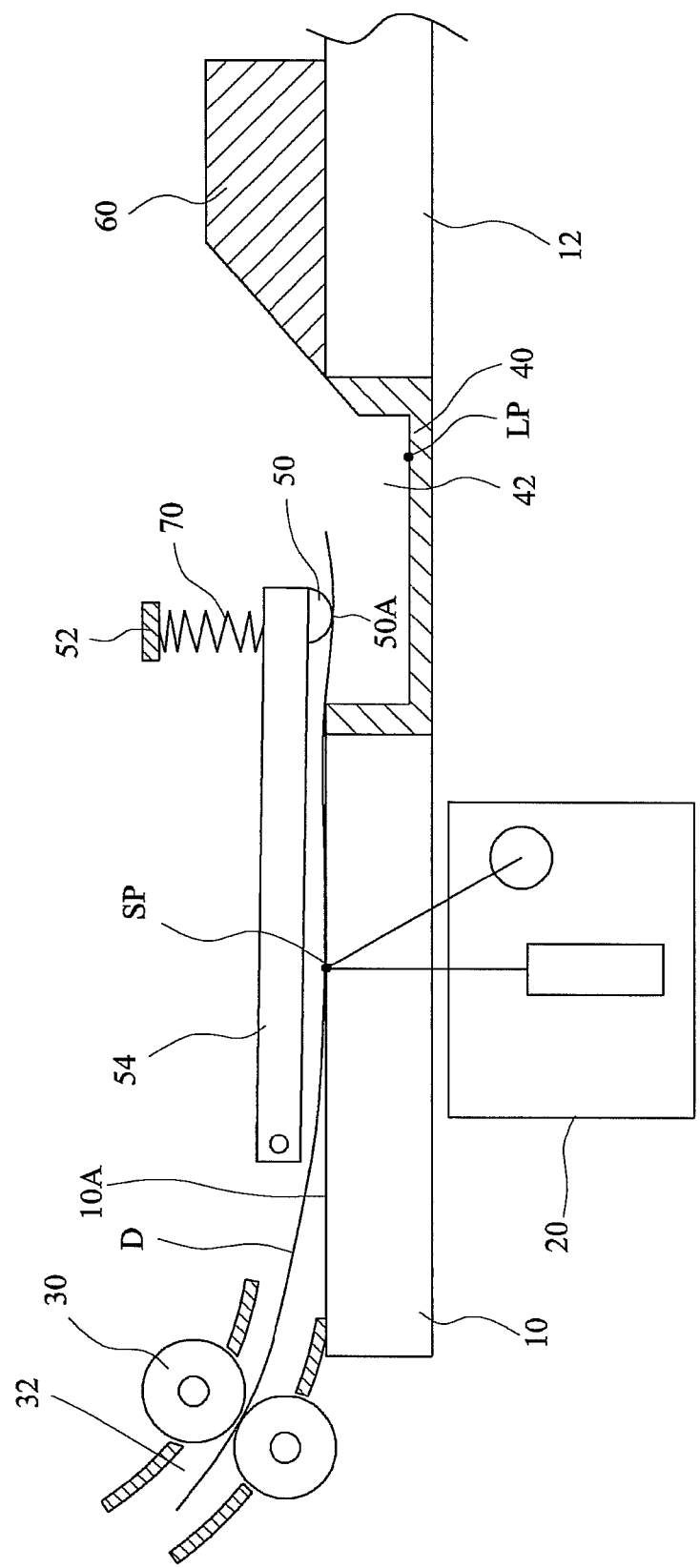
FIG. 1 is a schematic illustration showing a scanning device according to a first embodiment of the invention.
Figure 2:
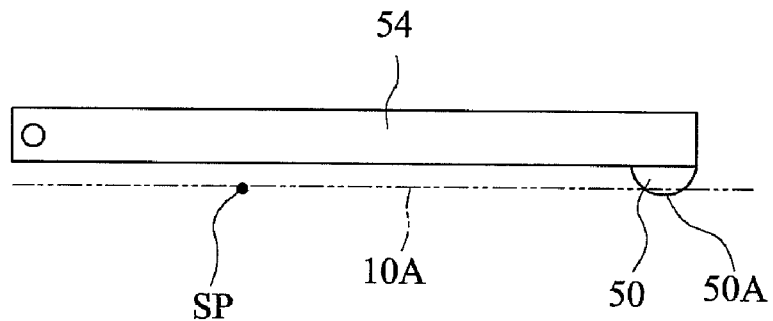
FIGS. 2 to 4 show several pressing units according to several examples of the invention.

FIG. 1 is a schematic illustration showing a scanning device according to a first embodiment of the invention. FIG. 2 is a schematic illustration showing a pressing unit corresponding to FIG. 1. Referring to FIGS. 1 and 2, the scanning device of this invention includes a transparent platen 10, a scanning module 20, a sheet-feeding mechanism 30, a section 40 and a first pressing unit 50. The scanning module 20 is disposed at a scan position SP and acquires an image of a document D through the transparent platen 10. The sheet-feeding mechanism 30 transports the document D in a transporting direction across the scan position SP. The transporting direction is defined by a path direction of a sheet passageway 32.

The section 40 is located downstream of the scan position SP and has a low point LP at a level lower than that of an upper surface 10A of the transparent platen 10. The so-called downstream is determined according to a moving direction of the document D. Therefore, the document D is first transported across the scan position SP, and then across the section 40. The pressing unit 50, disposed opposite the section 40 and limits a distance between the document D and the transparent platen 10. The pressing unit 50 may be a projection or the like. In this embodiment, the pressing unit 50 is fixed on a rocker arm 54 capable of swinging relative to a housing 52. This embodiment further includes a biasing device 70, connected to the pressing unit, for providing a biasing force to the pressing unit 50 in order to bias the pressing unit toward the section 40 by the rocker arm 54. The biasing device 70, for example, could be a spring. Alternatively, the biasing device 70 may be omitted so that the pressing unit 50 is biased toward the section 40 by self weight or self resilience of the pressing unit 50. Alternatively, a magnetic force may be applied to the pressing unit 50 to bias the pressing unit 50 toward the section 40.

In this embodiment, the section 40 has an opening 42, and a gap is formed between the pressing unit 50 and the low point LP of the section 40. Alternatively, the section 40 may also include an inclined surface as long as the low point LP of the section 40 is set at a level lower than that of the upper surface 10A of the transparent platen 10.

In this embodiment, the section 40 is located adjacent to the transparent platen 10. In order to output the document more smoothly, the scanning device further includes a guiding element 60, disposed downstream of the section 40 and adjacent to the section 40, for guiding the document D out from the sheet passageway.

The transparent platen 10 is usually using a glass sheet, which is joined with another glass sheet 12 through the section (connecting element) 40. The transparent platen 10 is used when a sheet-fed scanning process is being performed, while the glass sheet 12 is used when a flatbed scanning process is being performed. It is to be noted that the scanning device of the invention may be directly applied to a pure sheet-fed scanner. The guiding element 60, disposed on the glass sheet 12 or between the transparent platen 10 and the glass sheet 12, guides the document D to move in a direction toward a sheet output tray (not shown). The opening 42 of the section 40 provides a space for the movement of the pressing unit 50. Consequently, in a normal state, a contact portion 50A between the pressing unit 50 and the document D has to be lower than the upper surface 10A of the transparent platen 10. Therefore, the document D being transported across the scan position SP can completely slide on the upper surface 10A of the transparent platen 10.

Figure 3:
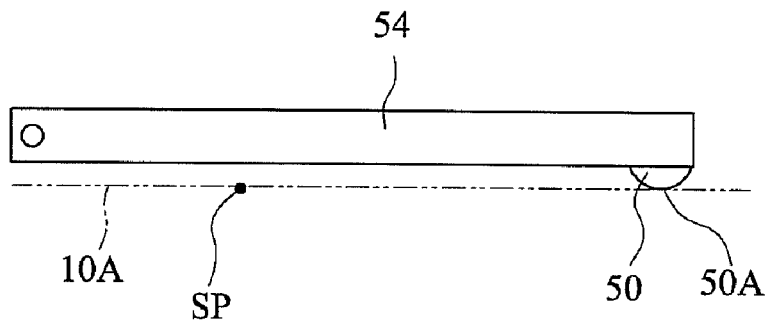

FIG. 3 shows another example of the pressing unit. For the sake of illustration, a phantom line is extended from the upper surface 10A of the transparent platen 10. In this example, a low point 50A where the first pressing unit 50 contacts with the document D is set at a level flush with the level of the upper surface 10A of the transparent platen 10 at the scan position SP.

Figure 4:
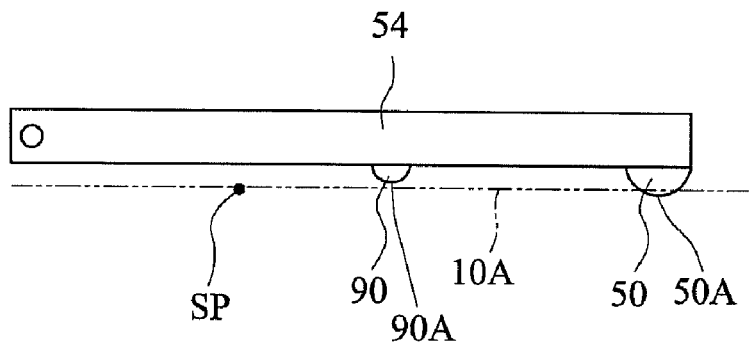

FIG. 4 shows still another example of the pressing unit. As shown in FIG. 4, the scanning device of this invention further includes a second pressing unit 90, which is mounted on the rocker arm 54 and disposed opposite the transparent platen 10. The second pressing unit 90 and the first pressing unit 50 may be disposed on the same side or opposite sides of the scan position SP. A lowest point 90A of the second pressing unit 90 is located at a level higher than that of the upper surface 10A of the transparent platen 10 at the scan position SP. Therefore, a gap may be formed between the second pressing unit 90 and the transparent platen 10 so that the document D may be transported across the gap.

It is to be noted that the first pressing unit 50 or the second pressing unit 90 may have an arc surface so that it can be smoothly raised by the document D and the document may be pressed. Alternatively, the document and the pressing unit are kept in a state similar to a point-contact state.

It is to be noted that the pressing unit may also be replaced with a roller. Because the structure is very simple and may be easily derived according to the following embodiments, detailed descriptions thereof will be omitted.

Figure 5:
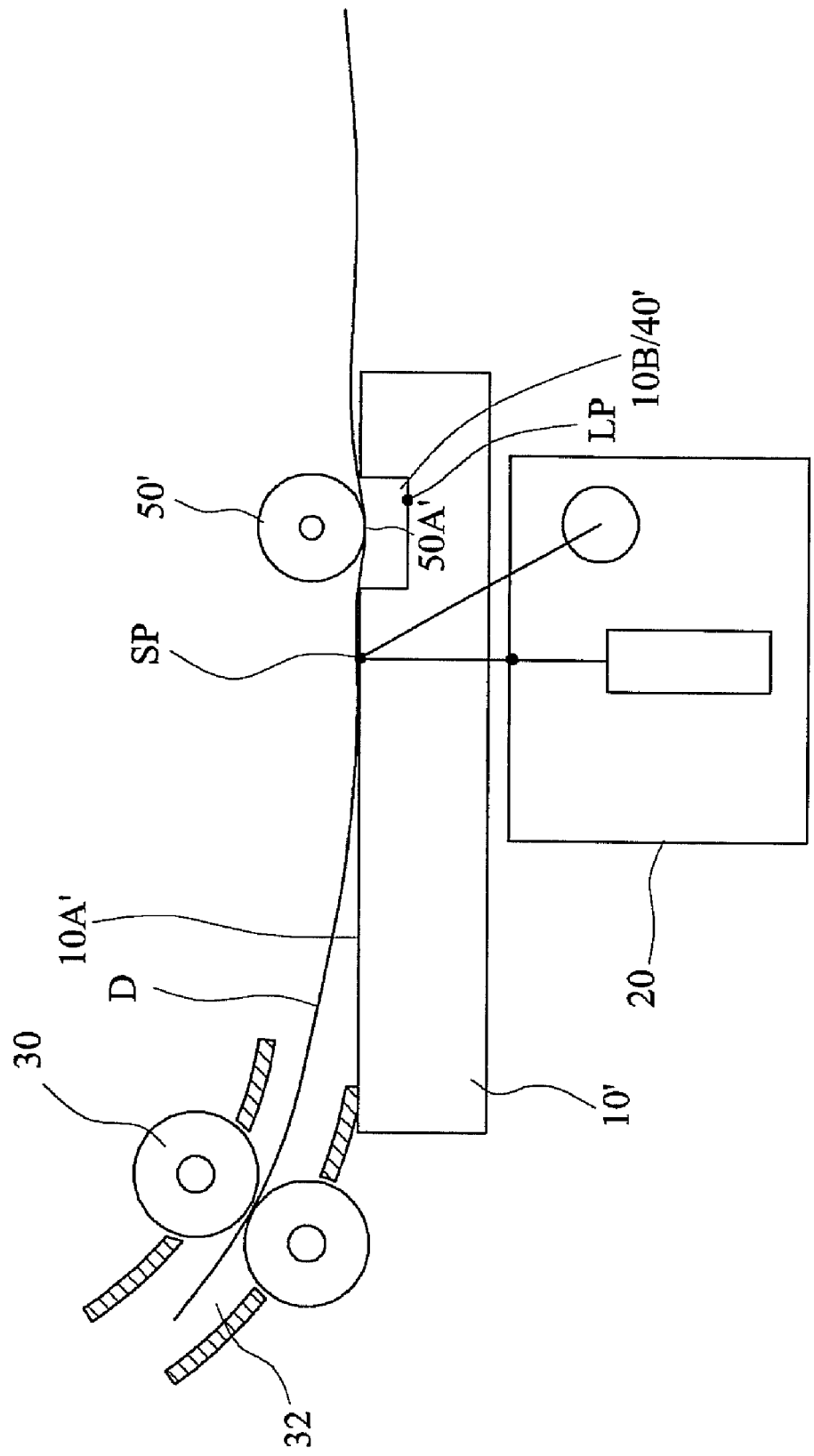
FIG. 5 is a schematic illustration showing a scanning device according to a second embodiment of the invention.

FIG. 5 is a schematic illustration showing a scanning device according to a second embodiment of the invention. As shown in FIG. 5, the scanning device of FIG. 5 is similar to that of the first embodiment except that the scanning device of this embodiment is a pure sheet-fed scanner, and the pressing unit 50' is a roller. The low point 50A' of the roller 50' is set in an opening 10B of the transparent platen 10. Herein, the opening 10B may be defined as one portion of the section 40'. The lowest point LP of the section 40' is still located at a level lower than that of the upper surface 10A' of the transparent platen 10'.

Figure 6:
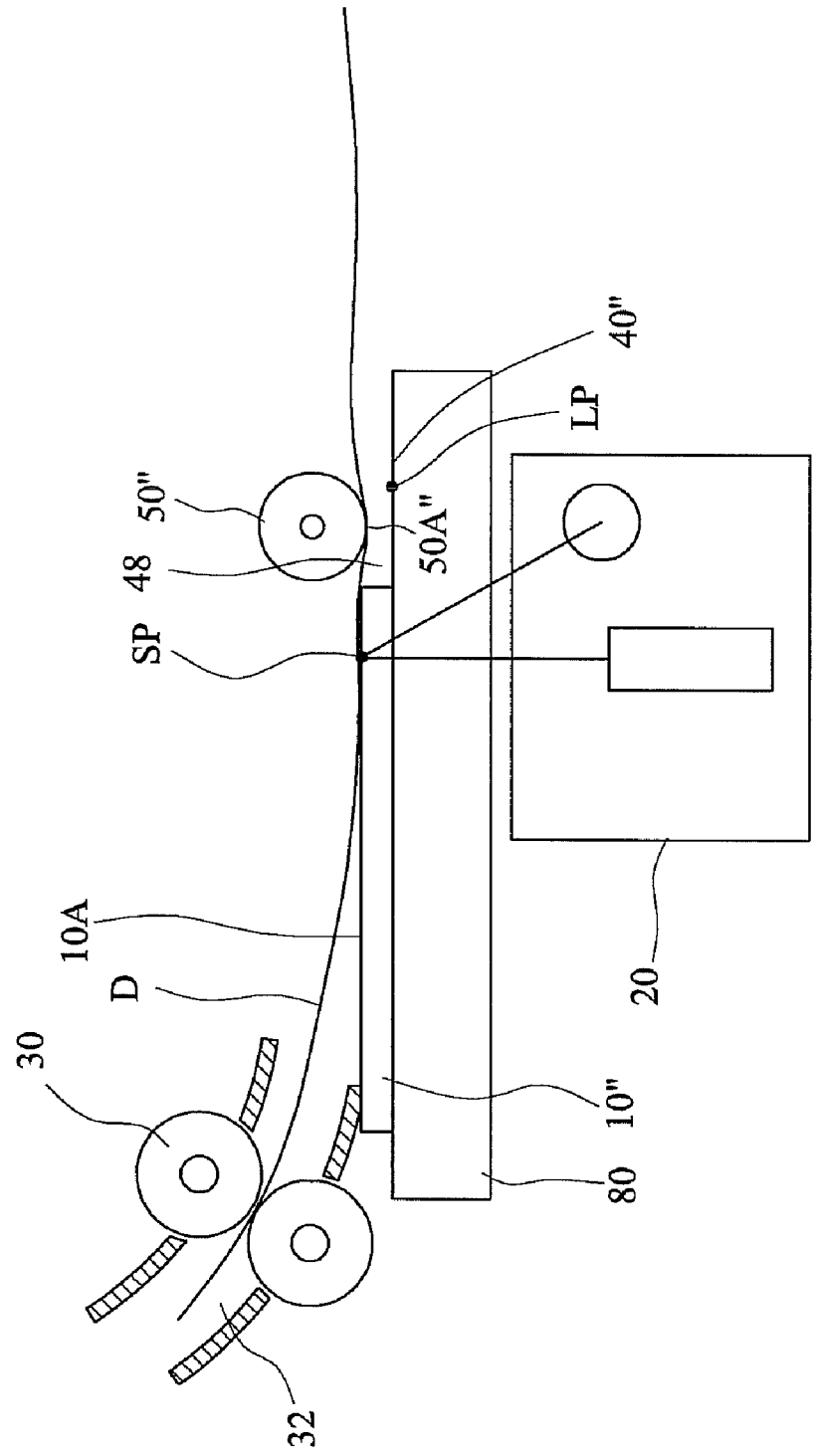
FIG. 6 is a schematic illustration showing a scanning device according to a third embodiment of the invention.

FIG. 6 is a schematic illustration showing a scanning device according to a third embodiment of the invention. As shown in FIG. 6, this embodiment is similar to the first embodiment except that the scanning device of this embodiment further includes a lower platen 80 disposed below the transparent platen 10". A step 48 is formed between the lower platen 80 and the transparent platen 10", and the low point 50A" of the pressing unit 50" is set in the step 48.

Figure 7:
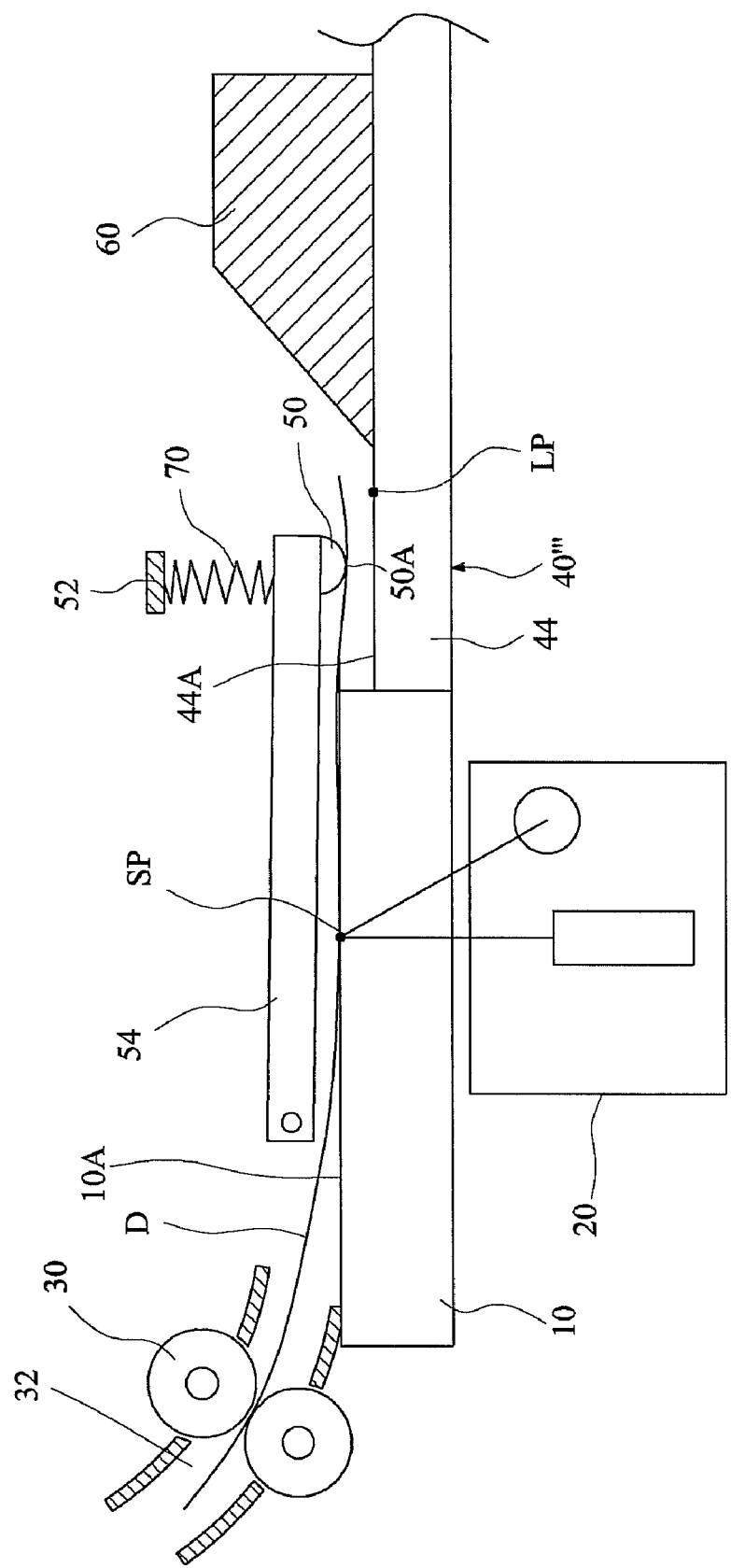
FIG. 7 is a schematic illustration showing a scanning device according to a fourth embodiment of the invention.

FIG. 7 is a schematic illustration showing a scanning device according to a fourth embodiment of the invention. As shown in FIG. 7, this embodiment is similar to the first embodiment except that the section 40''' of the scanning device of this embodiment includes a platen 44 disposed adjacent to the transparent platen 10. An upper surface 44A of the platen 44 is lower than the upper surface 10A of the transparent platen 10, and the pressing unit 50 is disposed opposite the platen 44. The thickness of the platen 44 is thinner that that of the transparent platen 10.

According to the embodiments of the invention, the pressing unit disposed downstream of the scan position may press the document to reduce the wear between the pressing unit and the transparent platen, and effectively control the distance between the document and the scan platen.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A scanning device, comprising:
   a transparent platen;
   a scanning module, disposed at a scan position, for acquiring an image of a document through the transparent platen;
   a sheet-feeding mechanism for transporting the document in a transporting direction across the scan position;
   a section, which is located downstream of the scan position and has a low point at a level lower than a level of an upper surface of the transparent platen; and
   a pressing unit, disposed opposite the section, for limiting a distance between the document and the transparent platen, wherein a contact portion between the pressing unit and the document is lower than the upper surface of the transparent platen.

2. The scanning device according to claim 1, wherein the section is located adjacent to the transparent platen.

3. The scanning device according to claim 1, further comprising a guiding element, disposed downstream of the section and located adjacent to the section, for guiding the document out.

4. The scanning device according to claim 1, wherein a gap is formed between the pressing unit and the low point of the section.

5. The scanning device according to claim 1, wherein a surface of the pressing unit facing the section forms a projection.

6. The scanning device according to claim 1, wherein the pressing unit is a roller.

7. The scanning device according to claim 1, further comprising a biasing device, connected to the pressing unit, for providing a biasing force to the pressing unit to bias the pressing unit toward the section.

8. The scanning device according to claim 1, wherein the pressing unit is biased toward the section by self weight or self resilience of the pressing unit.

9. The scanning device according to claim 1, wherein a magnetic force is applied to the pressing unit to bias the pressing unit toward the section.

10. The scanning device according to claim 1, wherein the section comprises an opening.

11. The scanning device according to claim 1, wherein the section comprises an inclined surface.

12. The scanning device according to claim 1, further comprising a lower platen disposed under the transparent platen, wherein the section comprises a step formed between the lower platen and the transparent platen.

13. The scanning device according to claim 1, wherein the section comprises a platen disposed adjacent to the transparent platen, and an upper surface of the platen is lower than the upper surface of the transparent platen.

14. The scanning device according to claim 1, further comprising a second pressing unit disposed opposite the transparent platen.

15. The scanning device according to claim 14, wherein a gap is formed between the second pressing unit and the transparent platen.

* * * * *